US005563976A

United States Patent [19]
Rowland

[11] Patent Number: 5,563,976
[45] Date of Patent: Oct. 8, 1996

[54] SEMICONDUCTIVE LINEAR ELEMENT INCLUDING PARTIALLY PYROLISED POLYACRYLONITRILE

[75] Inventor: Simon M. Rowland, Tarporley, England

[73] Assignee: BICC Public Limited Company, London, England

[21] Appl. No.: 354,090

[22] Filed: Dec. 6, 1994

[30] Foreign Application Priority Data

Dec. 17, 1993 [GB] United Kingdom ............ 9325799

[51] Int. Cl.$^6$ ........................................... G02B 6/44
[52] U.S. Cl. ................... 385/101; 385/109; 385/141; 174/70 R
[58] Field of Search ....................... 385/100, 101, 385/102, 106, 105, 109; 174/68.1, 70 R

[56] References Cited

U.S. PATENT DOCUMENTS

| | | | |
|---|---|---|---|
| 4,365,865 | 12/1982 | Stiles | 385/101 |
| 4,673,247 | 6/1987 | Oestreich | 385/102 X |
| 4,776,665 | 10/1988 | Oestreich | 385/102 |
| 4,815,813 | 3/1989 | Arroyo et al. | 385/102 |
| 4,838,635 | 6/1989 | Oestreich | 385/101 |
| 5,195,158 | 3/1993 | Bottoms, Jr. et al. | 385/105 |
| 5,233,736 | 8/1993 | Hill | 28/265 |

FOREIGN PATENT DOCUMENTS

| | | |
|---|---|---|
| 0214480A2 | 8/1986 | European Pat. Off. . |
| 315824A1 | 5/1989 | European Pat. Off. . |
| 403285A2 | 12/1990 | European Pat. Off. . |
| 7146003 | 8/1972 | France . |
| 3618659A1 | 10/1987 | Germany . |
| 2236197 | 3/1991 | United Kingdom . |
| 2240189 | 7/1991 | United Kingdom . |
| WO91/16648 | 10/1991 | WIPO . |
| WO93/23779 | 11/1993 | WIPO . |
| WO94/24596 | 10/1994 | WIPO . |

OTHER PUBLICATIONS

"Self–Supporting Dielectric Fiber Optic Cables in High Voltage Lines," Ulrich H. P. Oestreich and Hani M. Nassar, International Wire & Cable Symposium Proceedings 1988, pp. 79–82.
"Development of aerial fibre optic cables for operation on 400 kV power lines," A. J. Peacock and J. C. G. Wheeler, IEE PROCEEDINGS–A, vol. 139, No. 6, Nov. 1992, pp. 304–314.
"Carbon Black For Electrically Conductive Plastics" by David J. Sommers, May 1983, pp. 83–99, copyright 1984, Polym. –Plast. Technology Eng., 23(1).
"Anomalous Electrical Behaviour of Polymer–Carbon Composites as a Function of Temperature" by R. F. Reidy and G. Simkovich, Journal of Materials Science, 28, 1993, pp. 799–804.
Copy of 8049c IEE Proceedings–Part C. vol. 139, No. 3, Stevenage, Herts., GB–article dated, May 1, 1992, by C. N. Carter and M. A. Waldron, *Mathematical model of dry–band arcing on self–supporting, all dielectric, optical cables strung on overhead power lines*, pp. 185–196.

*Primary Examiner*—Rodney B. Bovernick
*Assistant Examiner*—Hemang Sanghavi
*Attorney, Agent, or Firm*—Nath & Associates; Gary M. Nath

[57] ABSTRACT

A linear element (1,61) suitable for extending between, and being supported by, towers of an overhead electrical power transmission system, includes one or more electrically semiconductive components (54, 62) that cause the element to have a linear resistance of 0.05 to 100 Mohms m$^-$, and which exhibit a negative temperature coefficient of resistance. The element may be a rope used for stringing up conductors of the system or it may be an optical cable. Preferred materials for forming the semiconductive components include carbonaceous fibre tows formed from pyrolised acrylonitrile fibres. The element has a controllable and reproducible resistance for reducing or eliminating dry-band arcing.

24 Claims, 3 Drawing Sheets

SEMICONDUCTIVE LINEAR ELEMENT INCLUDING PARTIALLY PYROLISED POLYACRYLONITRILE

BACKGROUND OF THE INVENTION

1. Field of the Invention

This invention relates to linear elements that are intended to extend along overhead electrical power transmission systems, and especially, although not necessarily, to optical cables that are supported along the route of the system by means of towers, masts or other upstanding supports that are also employed to support electrical power cables.

2. Brief Discussion of the Prior Art

In systems of this kind it is the general practice to earth the optical cable or cables at the towers, masts or other supports (hereinafter simply referred to as towers). When the electrical power lines are on load, electrical currents may be capacitively induced on the optical cable due to the distributed capacitance between the cable and the power lines. The voltage induced on the optical cable will reach a maximum at mid span between the towers, while the current flowing along the cable will be greatest in the region of the towers. Under dry conditions the induced currents will be relatively small due to the relatively high longitudinal resistance of the cable, e.g. in the region of $10^{12}$ Mohm m$^{-1}$ but under wet conditions when the surface resistance of the cable is much lower, e.g. in the region of 10 Mohm m$^{-1}$ much higher currents will be induced. Joule heating of the cable surface by the induced currents can cause a short length of the cable surface to become dry, usually in the region of a tower where the current is highest. When this happens the major part of the induced voltage on the cable is dropped across the short dry band due to its high longitudinal resistance, and so called "dry-band arcing" may occur which can cause severe damage to the cable. Similar problems may be experienced with other linear elements that may be extended between towers of the transmission system, for example with ropes that are used to install optical cables in the power transmission system. Although such ropes are only intended to be temporarily suspended between the towers, they can absorb significant quantities of water in wet ambient conditions, with the result that damaging currents may be induced.

It is possible to overcome the problem of dry-band arcing in an optical cable by providing the cable with a longitudinally extending electrically conductive path. However, an optical cable having such an electrically conductive path has the disadvantage that there are considerable safety issues to be taken into account if it is to be installed between towers of an overhead electric power transmissions line that is on load in view of the danger of it touching one of the transmission lines; moreover, it is not always possible or desirable to interrupt the electrical power transmitted by the overhead electric power transmission line for a time sufficient to enable such an optical cable to be installed.

It has been proposed, for example in European Patent Application No: 214,480, to employ a cable having a semiconducting element and a linear resistance of 10 to $10^6$ Mohm m$^{-1}$. However, it is normally very difficult to form semiconducting elements having such resistance values in a consistent and reproducible manner using conventional methods since the particular resistance value is extremely sensitive to filler loading etc. with the result that nominally identical cables may have significantly differing resistances, and that the resistance of a cable may vary significantly along its length. Furthermore, we have found that such values of linear resistance are undesirably high since the linear conductivity of such a cable can be determined by pollutants—e.g. acids and salt—found on the cable in wet conditions.

SUMMARY OF THE INVENTION

According to the present invention, the linear element, for example an optical cable or a rope for installing an optical cable, includes at least one electrically semiconductive component that causes the element to have a linear resistance in the range of from 0.05 to 100 Mohm m$^{-1}$ preferably less than 10 Mohm m$^{-1}$ and which exhibits a negative temperature coefficient of electrical resistance.

The present invention has the advantage that if any region of the cable is subject to a higher joule heating effect, for whatever reason, for example due to larger induced currents or to a higher initial resistance, any local associated temperature rise of the semiconductive component(s) will reduce the resistance of the component(s) and hence the heating effect. In contrast, the use of other systems such as percolation systems which normally exhibit positive temperature coefficient (PTC) behaviour can lead to an unstable system and even local thermal runaway.

Preferably the or each component has a negative temperature coefficient of resistance of at least 1% K$^{-1}$ and especially at least 1.5% K$^{-1}$ at ambient temperatures (that is to say, at about 300K), but will not usually have a temperature coefficient of resistance of more than 5% K$^{-1}$ and more usually, not more than 3% K$^{-1}$. A temperature coefficient of significantly more than 5% K$^{-1}$ will normally be associated with too high an ambient resistance value of the component.

One form of component that is particularly suitable in the present invention is one comprising carbonaceous fibres, and accordingly, a preferred aspect of the invention comprises a linear element suitable for extending between, and being supported by, towers of an overhead electrical power transmission system, which element includes one or more components comprising electrically semiconductive carbonaceous fibres which cause the element to have a linear resistance in the range of 0.05 to 100 Mohm m$^{-1}$. The use of carbonaceous fibres in the component allows one to control the linear resistance of the element in a very simple manner and so enable a reproducible semiconductive element to be produced.

Because optical cables tend to have a lower modulus and weight than that of the phase conductor they tend to be displaced laterally to a greater extent than the phase conductors in high winds and so can move into regions of high electric fields. If the cable is provided with a low resistance conductor, e.g. a metallic conductor, along its length, its potential will be substantially at earth potential throughout its entire span between towers, with the result that corona discharge may occur during high winds. There is even the possibility that the cable may become so close to the phase conductor that flashover between the phase conductor and the cable may occur which can cause the conductor extending along the optical cable to evaporate and will trip out the power supply. By virtue of the fact that the element according to the invention has a linear resistance in the range of 0.05 to 100 Mohm m$^{-1}$ the element has the advantage that its potential can reach or approximate to, that of the phase conductors of the system in the mid-span region, with the result that corona discharge at the surface of the element and flashover are reduced or eliminated.

The invention will be described hereafter with reference to optical cables, although it will be appreciated that the embodiments described are applicable to other linear elements such as ropes as well.

The carbonaceous fibres employed in the semiconductive component may be formed by partial pyrolysis of a polymer for example polyacrylonitrile or acrylonitrile copolymers having an acrylonitrile content of at least 85 mole percent and up to 15 mole percent of copolymers (PAN). Such fibres may have a carbon content of 65% to 92%, preferably less than 85% and a nitrogen content in the range of 5 to 20%, preferably 16 to 20%. Carbonaceous fibre tows that are suitable for use in the present invention are commercially available for example from R. K. Technologies Ltd of Heaton Norris, Stockport, Cheshire, United Kingdom.

The carbon fibres may be employed in the cable in a number of different constructions. Normally the or each semiconductive component will be in the form of a continuous tow of the carbonaceous fibres, in which case it may be wrapped around the core of the cable underneath a jacket thereof, or alternatively it may be wrapped around the jacket of the cable. Where a semiconductive component is in the form of a tow that is wrapped around the jacket of the cable, the tow is preferably enclosed in a sheath in order to protect it during handling and to protect it from the environment. If an insulating sheath is employed or, in the case where the tow is located under the cable jacket, an insulating cable jacket is employed, the tow will capacitively couple to the surface water on the sheath or jacket. If capacitive coupling is not sufficient, measures may be taken to increase the radial conductivity of the sheath or jacket without compromising its longitudinal resistance. Such measures may include patchy conductivity of the sheath or jacket due to incompletely dispersed filler or the use of a water-absorbent material for the sheath or jacket. The or each tow is preferably at least 5K, more preferably at least 10K, but preferably not more than 40K of fibres. The particular size of the tow that is used will depend on the conductivity of the fibres and is chosen so that the tow has the required overall resistance of 0.05 to 100 Mohm m$^{-1}$, preferably 0.5 to 10 Mohm m$^{-1}$. The carbonaceous fibres may be continuous, but this is not necessary. For example, chopped fibres may be employed in a polymeric matrix. Also, the fibres may be employed as a non-woven element for example as a mat or paper composite.

The semiconductive components may be incorporated in the cable during manufacture thereof as will be the case when they are wrapped around the core under the jacket, or they may, if desired, be incorporated in the cable only after the cable has been suspended from the towers, for example as described in international patent application No. WO 93/23779.

The or each semiconductive component is preferably stretchable in order to prevent it rupturing or cutting into, and damaging, the optical cable. Also, it is preferred for the electrical properties of the semiconductive component not to change significantly after repeated extensions in the order of 1%.

The invention also provides a combined overhead electrical power and optical transmission system which comprises overhead electrical power lines extending between, and supported by, towers, and at least one optical cable that extends between, and is freely supported by, the towers, the or each optical cable including at least one component extending along its length which causes the optical cable to have a linear resistance in the range of 0.05 to 100 Mohm m$^{-1}$ and which exhibits a negative temperature coefficient of resistance, the component preferably comprising electrically conductive carbonaceous fibres.

BRIEF DESCRIPTION OF THE DRAWINGS

Two forms of optical cable according to the invention will now be described way of example with reference to the accompanying drawings, in which.

DETAILED DESCRIPTION OF THE PREFERRED EMBODIMENT

Figure 1:
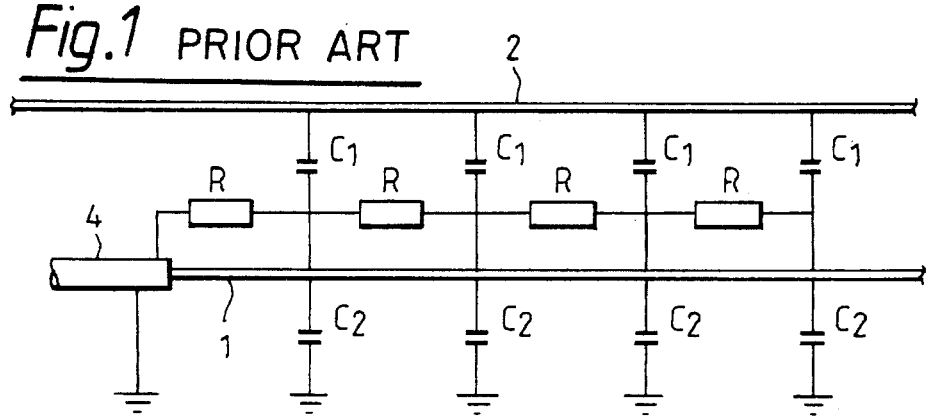
FIG. 1 is a schematic diagram of a conventional all dielectric optical cable and electric power line indicating the distributed capacitances.

Referring to the accompanying drawings, FIG. 1 illustrates a conventional "all dielectric self-supporting" (ADSS) optical cable 1 that is supported between a pair of towers that are also employed to support an electric power cable 2. The ADSS cable 1 is supported at the tower by means of a metallic clamp or fitting 4 which is earthed by means of the tower. In this system there is a distributed capacitance between the optical cable 1 and the power cable 2, indicated by lumped capacitances $C_1$, and a distributed capacitance between the optical cable 1 and ground, indicated by lumped capacitances $C_2$. In addition the cable has a large but finite longitudinal resistance indicated by lumped resistances R.

Figure 2:
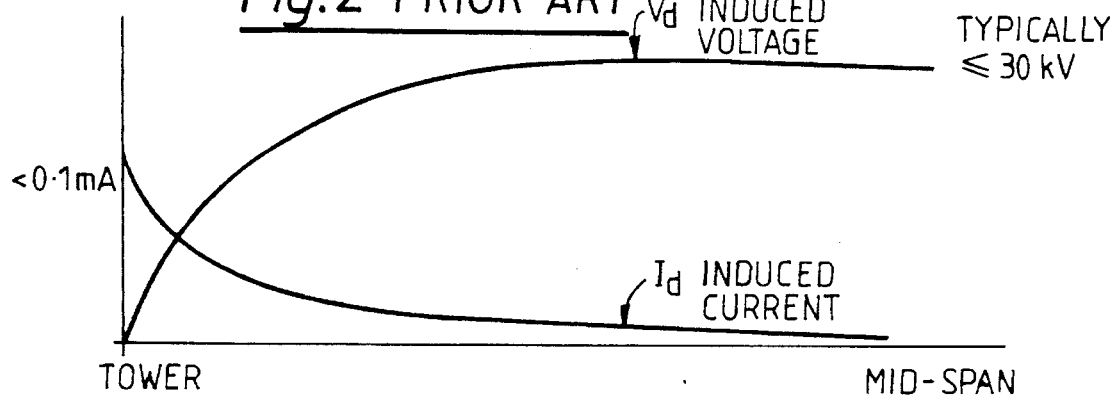
FIG. 2 is a graphical representation of the induced voltage and current on the optical cable in dry conditions.
Figure 3:
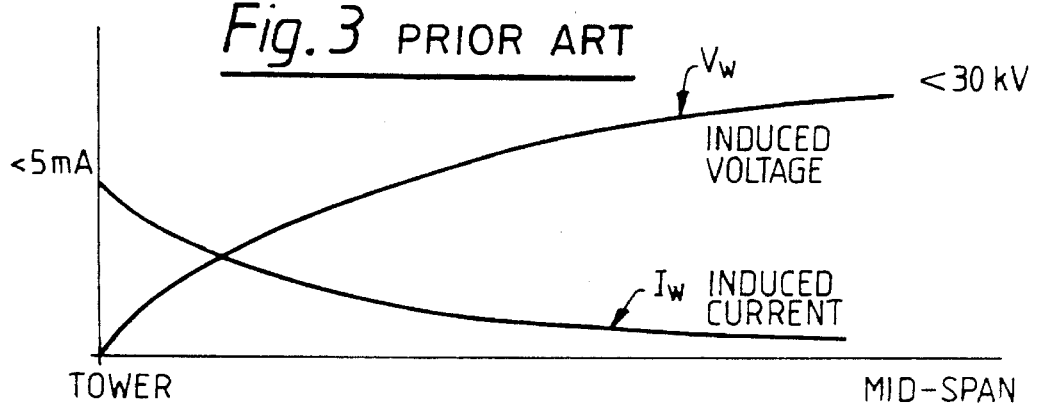
FIG. 3 is a graphical representation of the induced voltage and current on the optical cable in wet conditions with no dry band.

Under dry conditions induced voltages ($V_d$) and currents ($I_d$) occur on the cable as shown in FIG. 2. The induced voltage is highest at mid-span, typically reaching a value of up to 30 kV on a 400 kV line, and is clearly at earth potential at the tower, while the current will be at a maximum at the tower, for example having a value of up to 100 microamps. Under wet conditions the longitudinal resistance of the optical cable is considerably lower, with the result that the maximum voltage ($V_w$) on the optical cable is lower but the induced current ($I_w$) has risen considerably to a typical value of 1 to 10 mA, as shown in FIG. 3.

Figure 4:
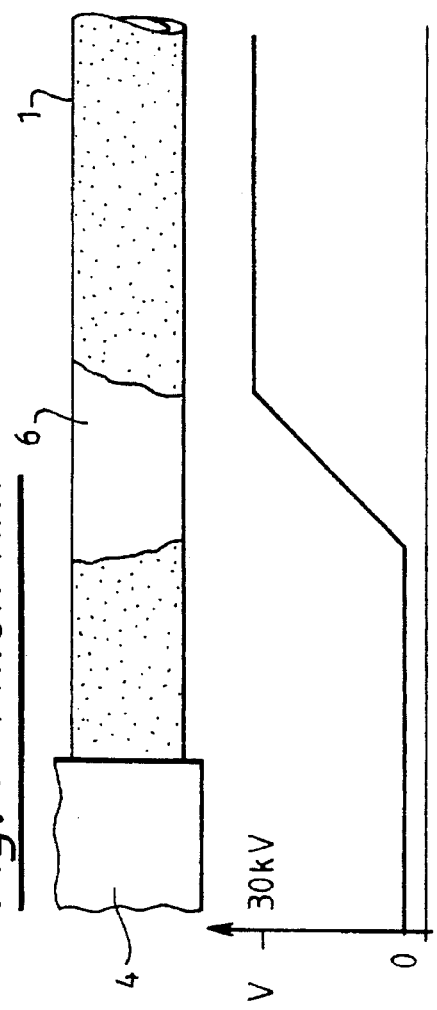
FIG. 4 is a schematic view of a conventional optical cable on which a dry band has formed.

Under these conditions, as shown in FIG. 4, a dry band 6 of typical length 50 mm may form on the cable 1 in the region of the clamp 4 at the tower, due to joule heating of the surface water on the cable. This has the result that almost the entire induced voltage is dropped across this length of cable, and arcing may occur at this point with consequent damage to the cable jacket.

Figure 5:
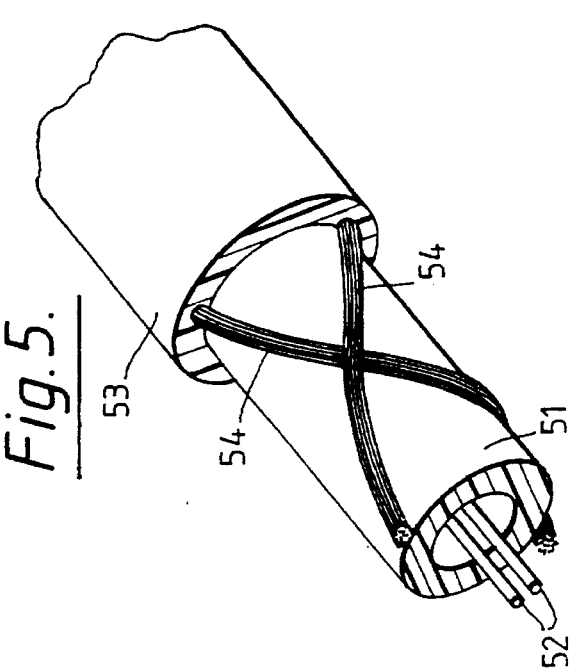
FIG. 5 is a schematic cross-sectional view of one form of cable according to the present invention.

FIG. 5 shows one form of optical cable 1 according to the invention that is intended to be freely supported between towers of a power distribution system. The cable comprises a conventional strength member 51 formed from pultruded E-glass that supports a number of optical fibres 52 suitable for transmission of light having a wavelength within the range of 0.8 to 2.1 micrometers, and an outer jacket 53 formed from a filled polyethylene or EVA composition. A pair of semiconductive tows 54 of partially pyrolized PAN fibres have been wound around the strength member 51 in opposite directions before the jacket 53 was extruded thereon, in order to provide a semiconductive path along the length of the cable between the towers. At the towers the tows 54 will be earthed by capacitive coupling to the cable clamp. Each tow 54 has approximately 10000 fibres and has an electrical resistance of about 0.8 Mohm m$^{-1}$.

Figure 6:
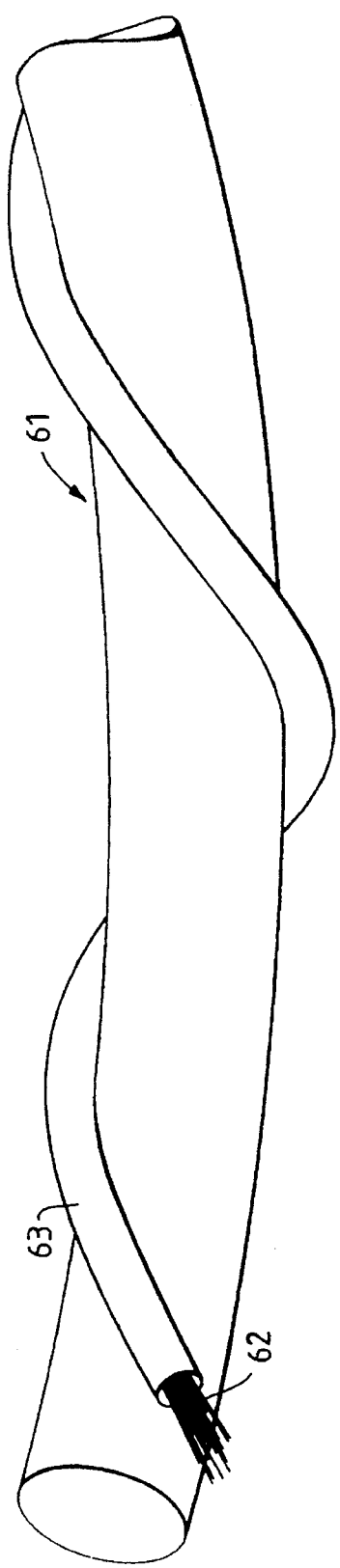
FIG. 6 is a schematic side view of part of another form of cable according to the invention.

FIG. 6 shows a short section of "All Dielectric Self Supporting" (ADSS) optical fibre cable 61 which comprises a strength member and optical fibres (not shown) and jacket as described with reference to FIG. 5. In this cable a 40K partially pyrolized PAN tow 62 of resistance 0.4 Mohm m$^{-1}$ 62 is enclosed in a jacket 63 and helically wrapped around the cable.

Figure 7:
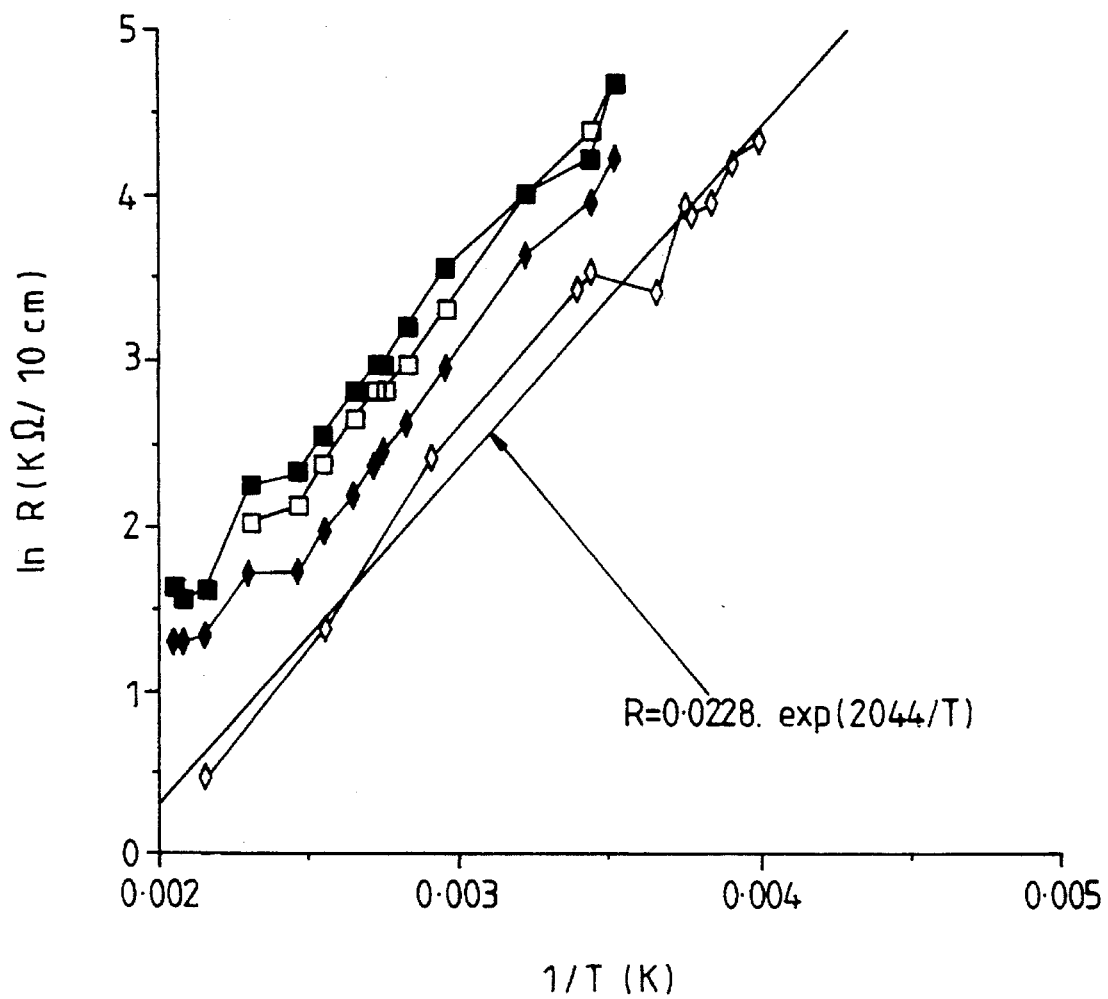
FIG. 7 is a graphical representation of the electrical resistance of various carbonaceous fibre tows employed in the invention against temperature.

FIG. 7 is a graph of the natural logarithm of the linear resistance (in kohm per 10 cm) of various tows of partially pyrolized PAN fibres plotted against the reciprocal of the absolute temperature. The differences in the resistance values of the different samples is due to the different fibre counts of the tows. As can be seen, the resistance values will give a good fit to a straight line of the form:

R=const. exp(2044/T)

which corresponds to a negative temperature coefficient of resistance of 2.2% K$^{-1}$ at 300K.

I claim:

1. A linear element suitable for extending between, and being supported by, towers of an overhead electrical power transmission system, which element includes at least one component comprising electrically semiconductive carbonaceous fibres which causes the element to have a linear resistance in the range of 0.05 to 100 Mohm m$^{-1}$, wherein the carbonaceous fibres comprise partially pyrolised polyacrylonitrile.

2. The element as claimed in claim 1, wherein said at least one component has a negative temperature coefficient of electrical resistance of at least 1% K$^{-1}$ at ambient temperature.

3. The element as claimed in claim 1, wherein said at least one component has a negative temperature coefficient of electrical resistance of at least 1.5% K$^{-1}$ at ambient temperature.

4. The element as claimed in claim 1, wherein said at least one component has a negative temperature coefficient of electrical resistance of 3% K$^{-1}$ or less at ambient temperature.

5. The element as claimed in claim 1, which is an optical cable.

6. The element as claimed in claim 1, which is a rope for installing an optical cable in the power transmission system.

7. The element as claimed in claim 1, wherein said at least one of the components is a tow of the carbonbaceous fibres.

8. The element as claimed in claim 7, wherein said at least one tow is wrapped around a core of the element underneath a jacket of the element.

9. The element as claimed in claim 7, wherein said at least one tow is wrapped around a jacket of the element.

10. The element as claimed in claim 9, wherein said at least one tow is enclosed in an electrically insulating sheath.

11. The element as claimed in claim 1, wherein the linear resistance of the element is determined substantially entirely by the carbonaceous fibre element or elements, in the absence of moisture.

12. The element as claimed in claim 1, which has a linear electrical resistance in the range of 0.1 to 10 Mohm m$^{-1}$.

13. The element as claimed in claim 1, wherein said carbonaceous fibres are formed by partial pyrolysis of a polymer having an acrylonitrile content of at least 85 mole %.

14. The element as claimed in claim 1, wherein said carbonaceous fibres have a carbon content of 65% to 92%.

15. The element as claimed in claim 1, wherein said carbonaceous fibres have a nitrogen content of 5% to 20%.

16. A combined overhead electrical power and optical transmission system which comprises overhead electrical power lines extending between, and supported by, towers, and at least one optical cable that extends between, and is freely supported by, the towers, said at least one optical cable including at least one component extending along its length which comprises electrically conductive carbonaceous fibres which causes the optical cable to have a linear resistance in the range of 0.5 to 100 Mohm m$^{-1}$, wherein the carbonaceous fibres comprise partially pyrolised polyacrylonitrile.

17. The element as claimed in claim 16, wherein said at least one component has a negative temperature coefficient of electrical resistance of at least 1% K$^{-1}$ at ambient temperature.

18. The element as claimed in claim 16, wherein said at least one component has a negative temperature coefficient of electrical resistance of at least 1.5% K$^{-1}$ at ambient temperature.

19. The element as claimed in claim 18, wherein said carbonaceous fibres have a carbon content of less than 85%.

20. The element as claimed in claim 16, wherein said at least one component has a negative temperature coefficient of electrical resistance of 3% K$^{-1}$ or less at ambient temperature.

21. The element as claimed in claim 16, wherein said carbonaceous fibres are formed by partial pyrolysis of a polymer having an acrylonitrile content of at least 85mole %.

22. The element as claimed in claim 16, wherein said carbonaceous fibres have a carbon content of 65% to 92%.

23. The element as claimed in claim 16, wherein said carbonaceous fibres have a carbon content of less than 85%.

24. The element as claimed in claim 16, wherein said carbonaceous fibres have a nitrogen content of 5% to 20%.

* * * * *